C. F. CLARK.
SUPPLY SYSTEM FOR WATER POWER PLANTS.
APPLICATION FILED MAY 9, 1910.
970,796.
Patented Sept. 20, 1910.
2 SHEETS—SHEET 1.
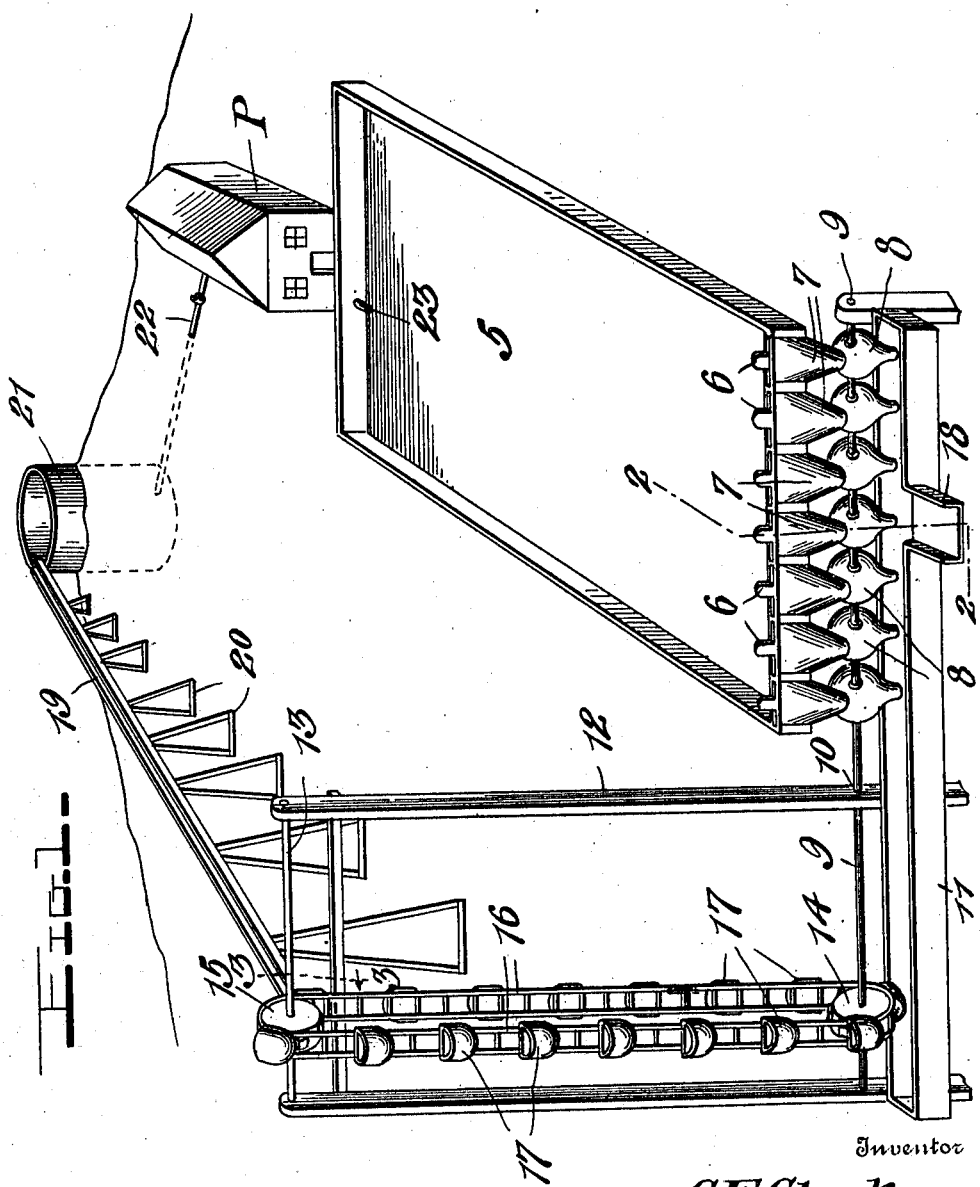
Witnesses
Chas. L. Griesbauer
E. M. Ricketts
Inventor
C. F. Clark,
By Watson E. Coleman.
Attorney

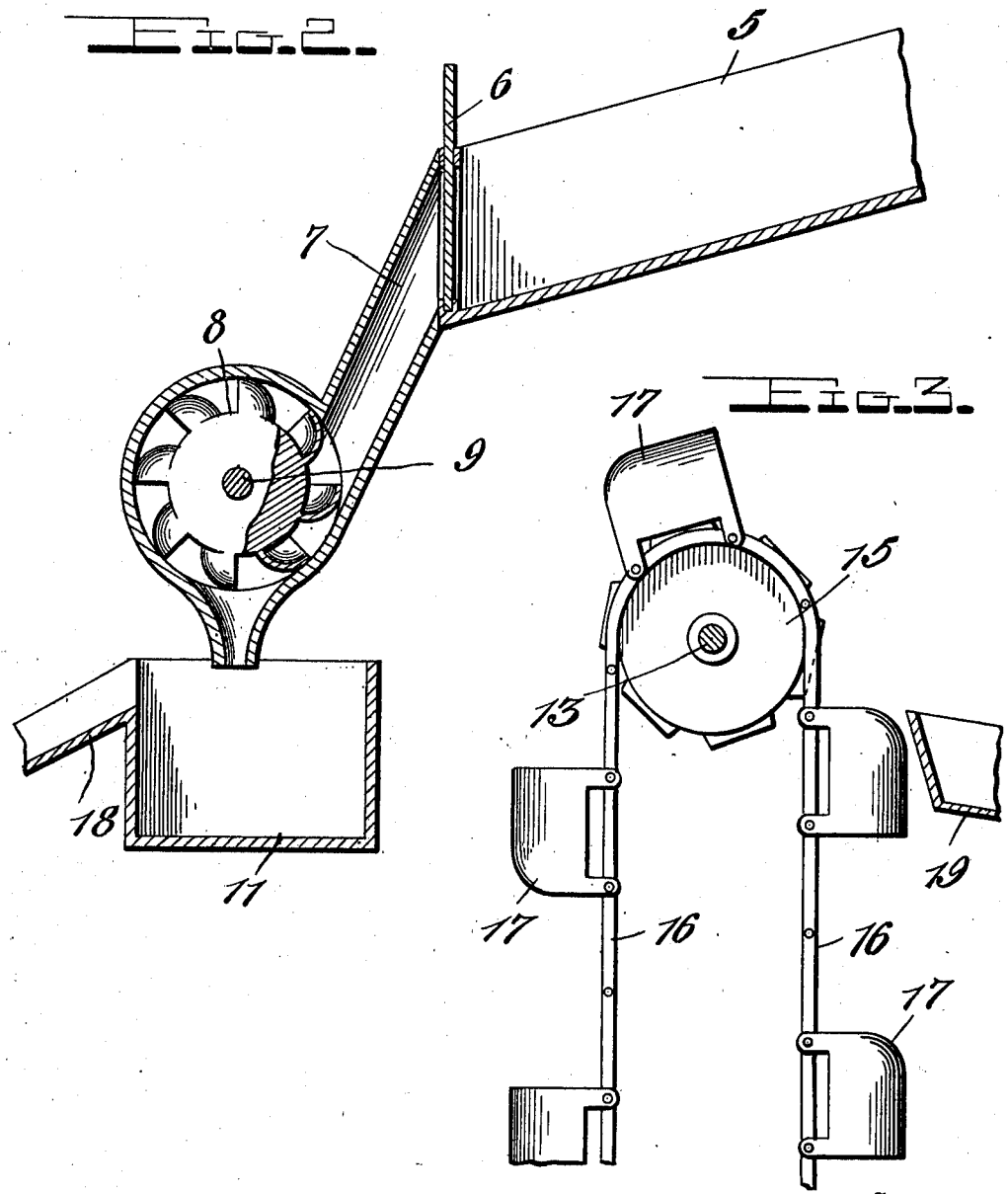

UNITED STATES PATENT OFFICE.

CHARLES FRANKLYN CLARK, OF CALISTOGA, CALIFORNIA.

SUPPLY SYSTEM FOR WATER-POWER PLANTS.

970,796.

Specification of Letters Patent. Patented Sept. 20, 1910.

Application filed May 9, 1910. Serial No. 560,141.

*To all whom it may concern:*

Be it known that I, CHARLES FRANKLYN CLARK, a citizen of the United States, residing at Calistoga, in the county of Napa and State of California, have invented certain new and useful Improvements in Supply Systems for Water-Power Plants, of which the following is a specification, reference being had to the accompanying drawings.

This invention relates to an improved water supply system for power plants and has for its object to utilize the change of tide of the ocean, bay or other body of water which is thus affected, and the invention resides in the provision of suitable means for conveying the water to a reservoir at a higher elevation than the rise of the tide, and then piping the water from this reservoir to the power plant.

A further object is to provide means whereby the water stored by the rise of the tide is caused to operate suitable mechanism to elevate a portion of the water to a flume which conveys the same to the reservoir.

With these and other objects in view, the invention consists of the novel features of construction, combination and arrangement of parts hereinafter fully described and claimed, and illustrated in the accompanying drawings, in which—

Figure 1 is a perspective view illustrating the general arrangement of parts comprising my improved system; Fig. 2 is a section taken on the line 2—2 of Fig. 1; and Fig. 3 is a section taken on the line 3—3 of Fig. 1.

In carrying out my invention, the apparatus is adapted to be arranged upon the beach or shore adjacent to an ocean, bay or other body of water which is affected by the change of tide. This apparatus comprises a large rectangular reservoir or storage tank 5 which may be of any desired proportions so as to receive as large a quantity of water as may be necessary to operate the particular power plant to which the system is applied, and cover the lapse of time between the rise of the tides. This main reservoir 5 is provided at one end with a plurality of gates 6 which may be either manually or mechanically actuated as desired to release the water contained in said reservoir. A plurality of conical nozzles or spouts 7 extend downwardly and outwardly from the gates 6 and are adapted to discharge the water with considerable force upon the turbines or water wheels 8. Any number of discharge nozzles 7 and the turbines 8 may be provided, and said turbines are arranged upon a shaft 9 which is mounted in a plurality of bearings 10.

The water is emptied from the pockets or buckets of the turbines 8 into a trough 11. At one side of the reservoir 5 a frame structure 12 is arranged. This frame structure may be of any desired height according to the elevation of the point at which the water is to be conveyed. Upon the top of this frame structure 12 a horizontal shaft 13 is mounted. A sprocket 14 is also rigidly secured upon the power shaft 9 and a similar sprocket 15 is also secured to the shaft 13. An endless chain 16 passes around these sprockets and carries a plurality of buckets 17. In passing around the lower sprocket wheel 14 these buckets are disposed in the water trough 11 and take up a quantity of water therefrom and elevate the same to the top of the frame 12. An overflow or outlet 18 is provided for the trough 11 to discharge the water therefrom in the event that it is poured into the trough from the turbines faster than it can be taken up by the elevating buckets.

A flume 19 extends inwardly from the beach or shore and is supported by means of a plurality of supporting trestles 20. One end of this flume is disposed immediately beneath the upper sprocket 15 over which the chain 16 passes so that as the buckets move over the sprocket they will discharge their contents into the flume. This flume extends from the elevating mechanism at a slight inclination and may be extended any desired distance to the point at which a second reservoir 21 is arranged. This reservoir as previously stated is at a considerably higher elevation than the reservoir 5 and the power plant but below the top of the frame supporting structure for the elevating mechanism. The water is conveyed to this reservoir 21 by the flume 19 and from said reservoir it is conveyed to the power plant by a pipe 22 where it is utilized in the running of the machinery.

The power plant P is preferably arranged at the inner end of the main reservoir or tank 5 and an exhaust pipe 23 extends therefrom through the rear wall of the reservoir to discharge the water exhausted from the power plant oack into said reservoir.

From the foregoing it is believed that the construction and arrangement of my improved system will be readily understood.

The various parts of the apparatus may be of any well known construction and while I have shown a plurality of turbines, it will be understood that if desired but one turbine or water wheel may be employed.

By the use of my improved system a continuous supply of water to the power plant may be had at all times, the reservoir 5 being sufficiently large to contain enough water to supply the plant from one rise of tide until the next.

While I have shown and described the preferred arrangement of the several parts of the system, it will be understood that this particular arrangement may be variously modified without departing from the essential feature or sacrificing any of the advantages of the invention.

Having thus described the invention what is claimed is:—

1. A water supply system for the purpose set forth comprising a main reservoir adapted to be arranged adjacent to a body of water affected by the change of tide, said reservoir being filled by the rise of the tide, a power shaft arranged beneath one end of the reservoir, a plurality of water wheels on said shaft, means arranged in one end of the reservoir to control the water and discharge the same on said water wheels to rotate said shaft, elevating mechanism operated by said shaft to elevate a portion of the water discharged from the reservoir, and means for conveying the water so elevated to a power plant.

2. A water supply system of the character set forth comprising a main reservoir adapted to be arranged adjacent to a body of water affected by the change of tide, said reservoir being filled by the rising of the tide, a power shaft arranged adjacent to one end of the reservoir, a plurality of water wheels arranged thereon, a discharge nozzle extending from the reservoir over each of the water wheels, a plurality of gates adapted to control the discharge of water from the reservoir into said nozzles, a trough arranged beneath the water wheels to receive the water discharged therefrom, a frame structure arranged adjacent to the reservoir, elevating mechanism supported by said frame structure and arranged on the shaft to be operated thereby, said mechanism being adapted to elevate a portion of the water from said trough, and means for conveying the water so elevated to a power plant.

3. A water supply system of the character set forth comprising a main reservoir adapted to be arranged adjacent to a body of water affected by the tides, said reservoir being filled by the rise of the tide, a power shaft mounted in bearings adjacent to one end of the reservoir, means for controlling the discharge of water from the reservoir, means arranged on the shaft to receive the water so discharged and rotate said shaft, a frame structure arranged adjacent to the reservoir, a shaft mounted in the upper end thereof, a sprocket on the power shaft and the shaft in the upper end of said frame, an endless chain connecting said sprockets and carrying a plurality of buckets, a trough arranged beneath said shaft to receive the water discharged from the reservoir, said buckets being adapted to elevate a portion of the water to the top of the frame, a second reservoir arranged at a higher elevation than the first named reservoir, an inclined flume extending from the upper end of the elevator to said reservoir, and a water conducting pipe connecting said reservoir to the power plant.

In testimony whereof I hereunto affix my signature in the presence of two witnesses.

CHARLES FRANKLYN CLARK.

Witnesses:
WM. Y. FLEMING,
HOWARD C. BUTLER.